United States Patent
Marshall et al.

(10) Patent No.: US 8,479,211 B1
(45) Date of Patent: Jul. 2, 2013

(54) DYNAMIC RESOURCE COMMITMENT MANAGEMENT

(75) Inventors: Bradley E. Marshall, Bainbridge Island, WA (US); Swaminathan Sivasubramanian, Seattle, WA (US); Tate Andrew Certain, Seattle, WA (US); Nicholas J. Maniscalco, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 266 days.

(21) Appl. No.: 12/826,572

(22) Filed: Jun. 29, 2010

(51) Int. Cl.
  *G06F 9/46* (2006.01)
  *G06F 17/30* (2006.01)

(52) U.S. Cl.
  USPC .......................................... 718/104; 707/770

(58) Field of Classification Search
  None
  See application file for complete search history.

(56) References Cited

U.S. PATENT DOCUMENTS

| | | | |
|---|---|---|---|
| 5,671,405 A * | 9/1997 | Wu et al. ............................. | 1/1 |
| 6,564,252 B1 * | 5/2003 | Hickman et al. ............... | 709/214 |
| 7,185,163 B1 | 2/2007 | Knight et al. | |
| 7,530,073 B1 | 5/2009 | Shutt et al. | |
| 7,562,217 B2 * | 7/2009 | Kurose .......................... | 713/168 |
| 7,788,233 B1 | 8/2010 | Iyer et al. | |
| 7,904,681 B1 | 3/2011 | Bappe et al. | |
| 8,046,446 B1 | 10/2011 | Karr et al. | |
| 2005/0108304 A1 | 5/2005 | Wilson et al. | |
| 2009/0198940 A1 | 8/2009 | Ash et al. | |

OTHER PUBLICATIONS

U.S. Appl. No. 12/826,576, "Notice of Allowance", Mar. 7, 2013, 11 pages.

* cited by examiner

*Primary Examiner* — Camquy Truong
(74) *Attorney, Agent, or Firm* — Kilpatrick Townsend & Stockton, LLP

(57) ABSTRACT

Various aspects of a data volume or other shared resource are determined and updated dynamically for purposes such as to provide guaranteed qualities of service. For example, the number of partitions in a data volume and/or the way in which data is stored across those partitions can be updated dynamically without significantly impacting the customer using the volume. The data stored to the volume can be striped or otherwise distributed across a number of logical areas, which then can be distributed across the partitions. Separate mappings can be used for the data in each logical area, and the logical areas in each partition, such that when moving a logical area only a single mapping has to be updated, regardless of the amount of data in that logical area. Further, logical areas can be moved between partitions without the need to repartition or redistributed the data in the data volume.

29 Claims, 9 Drawing Sheets

Getting just over 200 IOPS

Data stripes

DYNAMIC RESOURCE COMMITMENT MANAGEMENT

BACKGROUND

As an increasing number of applications and services are being made available over networks such as the Internet, an increasing number of content, application, and/or service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

In some environments, multiple users can share resources such as data repositories, wherein the users can concurrently send multiple read and/or write requests to be executed against the same data instance, for example. Problems can arise, however, such as when the number of concurrent requests exceeds the ability of the instance to process those requests, when the available bandwidth for a resource supporting the instance is no longer sufficient, or when the storage capacity for the instance and/or customer is no longer sufficient. In many cases issues such as insufficient storage capacity, number of input/output (I/O) operations per second (IOPS), and/or bandwidth can be addressed by increasing the number and/or amount of resources dedicated to those tasks. Such approaches can be very complicated, however, as almost all the data must be redistributed across resource instances and all mappings for that data updated accordingly. Further, such approaches can require the purchase, installation, and maintenance of additional components that might not otherwise be necessary.

BRIEF DESCRIPTION OF THE DRAWINGS

Various embodiments in accordance with the present disclosure will be described with reference to the drawings, in which.

DETAILED DESCRIPTION

Figure 1:
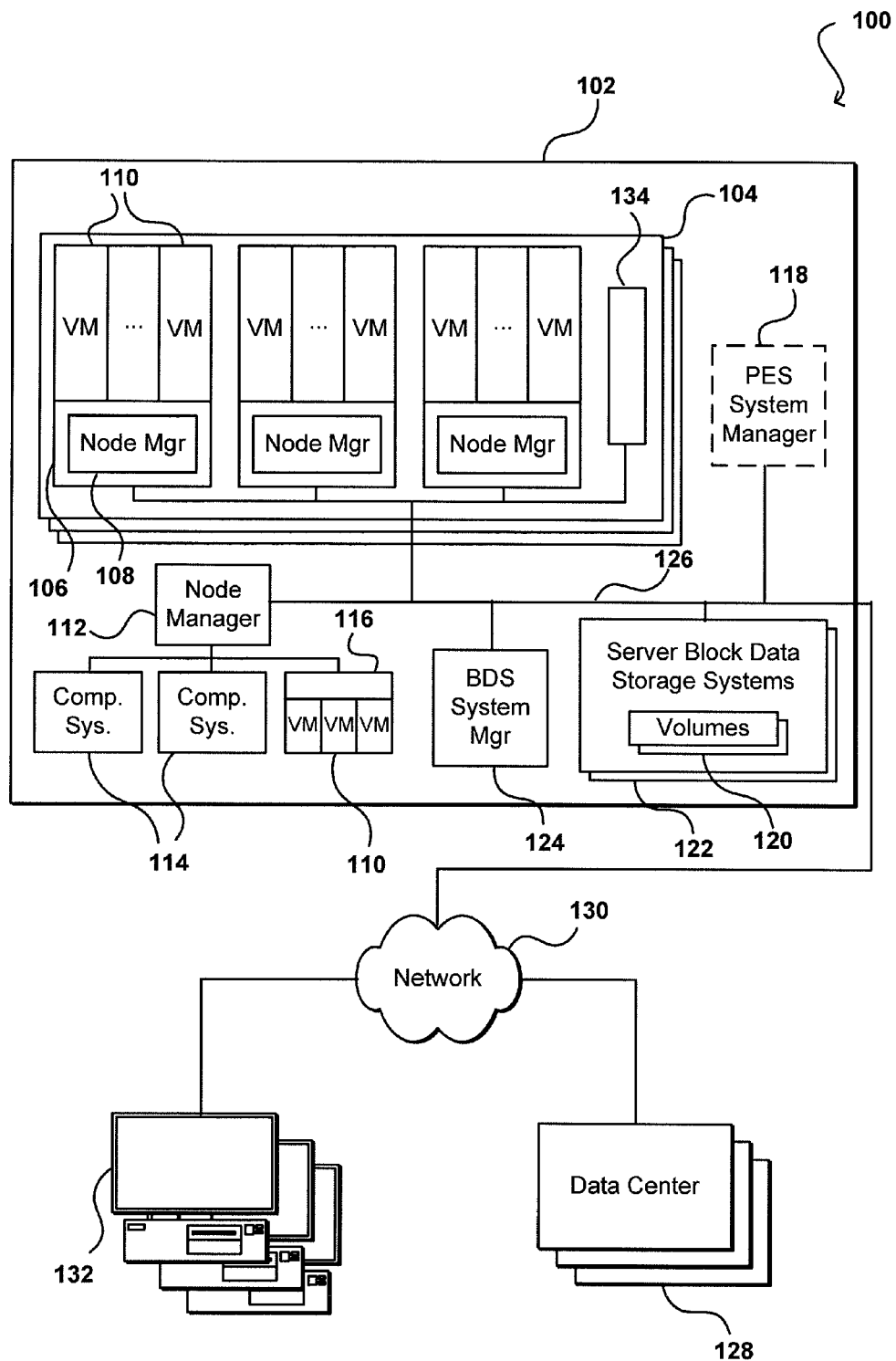
FIG. 1 illustrates an environment in which various embodiments can be implemented.

Systems and methods in accordance with various embodiments of the present disclosure may overcome one or more of the aforementioned and other deficiencies experienced in conventional approaches to managing aspects of resource sharing and allocation in an electronic environment. For example, various embodiments enable users to request a specific quality of service or level of processing, such as a minimum and/or committed rate of input/output operations per second (IOPS), bandwidth, and/or storage capacity for a given resource. The requested amount(s) can be any appropriate amount, which can be less or greater than the total amount provided by any single instance or device of the respective resource, providing improved granularity over that which is possible with conventional approaches. Multiple customers can be assigned to a single resource, such as a data server or data store, with each of the customers potentially receiving at least one guaranteed level of service. By managing the performance allocations for customers on various resources, systems and methods in accordance with various embodiments can enable customers to purchase appropriately-sized volumes that have an IOPS guarantee at any appropriate level, such as between 1 IOPS and 5,000 IOPS. By allocating portions of disks, spindles, and other such resources, a system can offer customers guaranteed and/or minimum levels of storage, IOPS, bandwidth, and other such functional aspects, which can be dynamically changed as needed and/or desired. In various embodiments, customers having commitments that cannot be provided by a single available resource can have the commitment spread across multiple resources or resource instances. For example, a data volume might include multiple physical storage devices (e.g., flash memory devices or data spindles) that each contain a portion of the data stored for a particular user.

Systems and methods in accordance with various embodiments enable various commitments, minimums, guarantees, and/or other such aspects to be adjusted dynamically, in response to customer requests, established thresholds, usage variations, or any of a number of other such criteria or inputs. The system can automatically adjust aspect of various resources as needed, such as to provision or allocate additional resources; add, move, or resize data volumes; split customers across multiple resources; or any of a number of other such actions as described and suggested herein. A system in accordance with various embodiments includes at least one monitoring component of a control plane, or control environment, operable to monitor usage of resources in a data environment and adjust the utilization of the resources based on established criteria. The control plane can include one or more interfaces (e.g., Web service APIs) enabling customers to request specific changes, or establish criteria to be used in making such changes. Various other approaches can be used as well within the scope of the various embodiments.

In some embodiments, the number of resources or resource instances can be adjusted automatically as the customer's needs or usage change. For example, if a customer needs more storage space, bandwidth, or IOPS, the system can automatically dedicate at least a portion of another resource instance to the customer, and can adjust the provisioning of the customer across those instances accordingly. If the customer's usage goes down, the system can dynamically decrease the number of resource instances that have at least a portion dedicated to that customer, and can adjust the data across a fewer number of instances.

In various embodiments, the provisioning or allocation of a customer can be automatically updated using the same number of resource instances. For example, if a customer is utilizing five storage devices (each being assigned a separate partition) in a data volume but the majority of the requests from that customer involve only two of those devices, the system can automatically move some of the data from the two busy devices to at least one of the other three devices, in order to more evenly spread the load across the devices. Spreading the load can increase the number of available IOPS, and can/or help the customer to obtain a higher overall bandwidth as the customer traffic can be spread over an increased number of devices. Small changes to the committed level of IOPS can be accomplished in some embodiments by changing an attribute of the partition or data volume as long as one or more of the servers for the partition has enough spare IOPS to satisfy the increased rate.

In order to reduce the amount of work necessary to move data for any of the rebalancing or scaling approaches discussed above, the customer data can be associated with a number of logical areas (other such logical groupings of data). Instead of distributing data evenly across a small number of partitions and/or storage devices, for example, the data can be striped (or otherwise apportioned) across a larger number of logical areas, which then each can be assigned to one of the partitions/storage devices. Each logical area can function as a logical sub-partition, which can be assigned to any of the partitions of a data volume. Using such an approach, if any portion of the data needs to be moved for reasons such as those discussed above, the system can simply move the appropriate number and/or selection of logical areas. In some embodiments, this can involve moving a small number of logical areas instead of a very large number of data stripes (or other such data groupings). The reduced number of objects to be moved not only simplifies the process, but also greatly simplifies the management of the mappings of the various data, as each logical unit can still contain the same large number of data stripes, and only the mapping of the much smaller number of logical area needs to be updated as a result of the movement.

Systems and methods in accordance with various embodiments are operable to manage access to resources such as data storage. In at least some embodiments, these approaches include providing a block data storage service that uses multiple server storage systems to reliably store block data that may be accessed and used over one or more networks by any of various users, applications, processes, and/or services. Users of the block data storage service may each create one or more block data storage volumes that each have a specified amount of block data storage space, and may initiate use of such a block data storage volume (also referred to as a "volume" herein) by one or more executing programs, with at least some such volumes having copies stored by two or more of the multiple server storage systems so as to enhance volume reliability and availability to the executing programs. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a volume stored on a server block data storage system in a data center may execute on one or more other physical computing systems at that data center.

In addition, in at least some embodiments, applications that access and use one or more such non-local block data storage volumes over one or more networks may each have an associated node manager that manages the access to those non-local volumes by the program, such as a node manager module that is provided by the block data storage service and/or that operates in conjunction with one or more Block Data Service (BDS) System Manager modules. For example, a first user who is a customer of the block data storage service may create a first block data storage volume, and execute one or more program copies on one or more computing nodes that are instructed to access and use the first volume (e.g., in a serial manner, in a simultaneous or other overlapping manner, etc.). When an application executing on a computing node initiates use of a non-local volume, the application may mount or otherwise be provided with a logical block data storage device that is local to the computing node and that represents the non-local volume, such as to allow the executing program to interact with the local logical block data storage device in the same manner as any other local hard drive or other physical block data storage device that is attached to the computing node (e.g., to perform read and write data access requests, to implement a file system or database or other higher-level data structure on the volume, etc.). For example, in at least some embodiments, a representative logical local block data storage device may be made available to an executing program via use of an appropriate technology, such as GNBD ("Global Network Block Device") technology. In addition, when an application interacts with the representative local logical block data storage device, the associated node manager may manage those interactions by communicating over one or more networks with at least one of the server block data storage systems that stores a copy of the associated non-local volume (e.g., in a manner transparent to the executing program and/or computing node) so as to perform the interactions on that stored volume copy on behalf of the executing program. Furthermore, in at least some embodiments, at least some of the described techniques for managing access of applications and services to non-local block data storage volumes are automatically performed by embodiments of a Node Manager module.

In at least some embodiments, block data storage volumes (or portions of those volumes) may further be stored on one or more remote archival storage systems that are distinct from the server block data storage systems used to store volume copies. In various embodiments, the one or more remote archival storage systems may be provided by the block data storage service (e.g., at a location remote from a data center or other geographical location that has a pool of co-located server block data storage systems), or instead may be provided by a remote long-term storage service and used by the block data storage, and in at least some embodiments the archival storage system may store data in a format other than block data (e.g., may store one or more chunks or portions of a volume as distinct objects).

In some embodiments, at least some of the described techniques are performed on behalf of a program execution service that manages execution of multiple programs on behalf of multiple users of the program execution service. In some embodiments, the program execution service may have groups of multiple co-located physical host computing systems, and may execute users' programs on those physical host computing systems, such as under control of a program execution service ("PES") system manager, as discussed in greater detail below. In such embodiments, users of the program execution service (e.g., customers of the program execution service who pay fees to use the program execution service) who are also users of the block data storage service may execute programs that access and use non-local block data storage volumes provided via the block data storage service. In other embodiments, a single organization may provide at least some of both program execution service capabilities and block data storage service capabilities (e.g., in an integrated manner, such as part of a single service), while in yet other embodiments the block data storage service may be provided in environments that do not include a program execution service (e.g., internally to a business or other organization to support operations of the organization).

In addition, the host computing systems on which programs execute may have various forms in various embodiments. Multiple such host computing systems may, for example, be co-located in a physical location (e.g., a data center), and may be managed by multiple node manager modules that are each associated with a subset of one or more of the host computing systems. At least some of the host computing systems may each include sufficient computing resources (e.g., volatile memory, CPU cycles or other CPU usage measure, network bandwidth, swap space, etc.) to execute multiple programs simultaneously, and, in at least some embodiments, some or all of the computing systems may each have one or more physically attached local block data storage devices (e.g., hard disks, tape drives, etc.) that can be used to store local copies of programs to be executed and/or data used by such programs. Furthermore, at least some of the host computing systems in some such embodiments may each host multiple virtual machine computing nodes that each may execute one or more programs on behalf of a distinct user, with each such host computing system having an executing hypervisor or other virtual machine monitor that manages the virtual machines for that host computing system. For host computing systems that execute multiple virtual machines, the associated node manager module for the host computing system may in some embodiments execute on at least one of multiple hosted virtual machines (e.g., as part of or in conjunction with the virtual machine monitor for the host computing system), while in other situations a node manager may execute on a physical computing system distinct from one or more other host computing systems being managed.

The server block data storage systems on which volumes are stored may also have various forms in various embodiments. In at least some embodiments, some or all of the server block data storage systems may be physical computing systems similar to the host computing systems that execute programs, and in some such embodiments may each execute server storage system software to assist in the provision and maintenance of volumes on those server storage systems. For example, in at least some embodiments, one or more of such server block data storage computing systems may execute at least part of the BDS System Manager, such as if one or more BDS System Manager modules are provided in a distributed peer-to-peer manner by multiple interacting server block data storage computing systems. In other embodiments, at least some of the server block data storage systems may be network storage devices that may lack some I/O components and/or other components of physical computing systems, such as if at least some of the provision and maintenance of volumes on those server storage systems is performed by other remote physical computing systems (e.g., by a BDS System Manager module executing on one or more other computing systems). In addition, in some embodiments, at least some server block data storage systems each maintains multiple local hard disks, and stripes at least some volumes across a portion of each of some or all of the local hard disks. Furthermore, various types of techniques for creating and using volumes may be used, including in some embodiments to use LVM ("Logical Volume Manager") technology.

In at least some embodiments, some or all block data storage volumes each have copies stored on two or more distinct server block data storage systems, such as to enhance reliability and availability of the volumes. By doing so, failure of a single server block data storage system may not cause access of executing programs to a volume to be lost, as use of that volume by those executing programs may be switched to another available server block data storage system that has a copy of that volume. In such embodiments, consistency may be maintained between the multiple copies of a volume on the multiple server block data storage systems in various ways. For example, in some embodiments, one of the server block data storage systems is designated as storing the primary copy of the volume, and the other one or more server block data storage systems are designated as storing mirror copies of the volume in such embodiments, the server block data storage system that has the primary volume copy (referred to as the "primary server block data storage system" for the volume) may receive and handle data access requests for the volume, and in some such embodiments may further take action to maintain the consistency of the other mirror volume copies (e.g., by sending update messages to the other server block data storage systems that provide the mirror volume copies when data in the primary volume copy is modified, such as in a master-slave computing relationship manner). Various types of volume consistency techniques may be used, with additional details included below.

In addition to maintaining reliable and available access of executing programs to block data storage volumes by moving or otherwise replicating volume copies when server block data storage systems become unavailable, the block data storage service may perform other actions in other situations to maintain access of executing programs to block data storage volumes. For example, if a first executing program unexpectedly becomes unavailable, in some embodiments the block data storage service and/or program execution service may take actions to have a different second executing program (e.g., a second copy of the same program that is executing on a different host computing system) attach to some or all block data storage volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple Web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location (e.g., the same data center) as the first program, while in other embodiments the second program may be at a different geographical location (e.g., a different data center, such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

As previously noted, in at least some embodiments, some or all block data storage volumes each have copies stored on two or more distinct server block data storage systems at a single geographical location, such as within the same data center in which executing programs will access the volume by locating all of the volume copies and executing programs at the same data center or other geographical location, various desired data access characteristics may be maintained (e.g., based on one or more internal networks at that data center or other geographical location), such as latency and throughput. For example, in at least some embodiments, the described techniques may provide access to non-local block data storage that has access characteristics that are similar to or better than access characteristics of local physical block data storage devices, but with much greater reliability that is similar to or exceeds reliability characteristics of RAID ("Redundant Array of Independent (or Inexpensive) Disks") systems and/or dedicated SANs ("Storage Area Networks") and at much lower cost. In other embodiments, the primary and mirror copies for at least some volumes may instead be stored in other manners, such as at different geographical locations (e.g., different data centers), such as to further maintain availability of a volume even if an entire data center becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

Furthermore, access to some or all of the described techniques may in some embodiments be provided in a fee-based or other paid manner to at least some users. For example, users may pay one-time fees, periodic (e.g., monthly) fees and/or one or more types of usage-based fees to use the block data storage service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of server block data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a onetime purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In some embodiments, one or more application programming interfaces (APIs) may be provided by the block data storage service, program execution service and/or remote long-term storage service, such as to allow other programs to programmatically initiate various types of operations to be performed (e.g., as directed by users of the other programs). Such operations may allow some or all of the previously described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the block data storage service.

FIG. 1 illustrates an example network configuration 100 in which multiple computing systems are operable to execute various programs, applications, and/or services, and further operable to access reliable non-local block data storage, such as under the control of a block data storage service and/or program execution service, in accordance with various embodiments. In particular, in this example, a program execution service manages the execution of programs on various host computing systems located within a data center 102, and a block data storage service uses multiple other server block data storage systems at the data center to provide reliable non-local block data storage to those executing programs. Multiple remote archival storage systems external to the data center may also be used to store additional copies of at least some portions of at least some block data storage volumes.

In this example, a data center 102 includes a number of racks 104, each rack including a number of host computing devices 106, as well as an optional rack support computing system 134 in this example embodiment. The host computing systems 106 on the illustrated rack 104 each host one or more virtual machines 110 in this example, as well as a distinct Node Manager module 108 associated with the virtual machines on that host computing system to manage those virtual machines. One or more other host computing systems 116 may also each host one or more virtual machines 110 in this example. Each virtual machine 110 may act as an independent computing node for executing one or more program copies (not shown) for a user (not shown), such as a customer of the program execution service. In addition, this example data center 102 further includes additional host computing systems 114 that do not include distinct virtual machines, but may nonetheless each act as a computing node for one or more programs (not shown) being executed for a user. In this example, a Node Manager module 112 executing on a computing system (not shown) distinct from the host computing systems 114 and 116 is associated with those host computing systems to manage the computing nodes provided by those host computing systems, such as in a manner similar to the Node Manager modules 108 for the host computing systems 106. The rack support computing system 134 may provide various utility services for other computing systems local to its rack 102 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system 118 is also illustrated that executes a PES System Manager module for the program execution service to assist in managing the execution of programs on the computing nodes provided by the host computing systems located within the data center (or optionally on computing systems located in one or more other data centers 128, or other remote computing systems 132 external to the data center). As discussed in greater detail elsewhere, a PES System Manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES System Manager module may coordinate with the Node Manager modules 108 and 112 to manage program execution on computing nodes associated with the Node Manager modules, while in other embodiments the Node Manager modules may not assist in managing such execution of programs.

This example the data center 102 also includes a computing system 124 that executes a Block Data Storage ("BDS") system manager module for the block data storage service to assist in managing the availability of non-local block data storage to programs executing on computing nodes provided by the host computing systems located within the data center (or optionally on computing systems located in one or more other data centers 128, or other remote computing systems 132 external to the data center). In particular, in this example, the data center 102 includes a pool of multiple server block data storage systems 122, which each have local block storage for use in storing one or more volume copies 120. Access to the volume copies 120 is provided over the internal network (s) 126 to programs executing on various computing nodes 110 and 114. As discussed in greater detail elsewhere, a BDS System Manager module may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS System Manager module may coordinate with the Node Manager modules to manage use of volumes by programs executing on associated computing nodes, while in other embodiments the Node Manager modules may not be used to manage such volume use. In addition, in other embodiments, one or more BDS System Manager modules may be structured in other manners, such as to have multiple instances of the BDS System Manager executing in a single data center (e.g., to share the management of non-local block data storage by programs executing on the computing nodes provided by the host computing systems located within the data center), and/or such as to have at least some of the functionality of a BDS System Manager module being provided in a distributed manner by software executing on some or all of the server block data storage systems 122 (e.g., in a Peer to-peer manner, without any separate centralized BDS System Manager module on a computing system 124).

In this example, the various host computing systems, server block data storage systems, and computing systems are interconnected via one or more internal networks 126 of the data center, which may include various networking devices (e.g., routers, switches, gateways, etc.) that are not shown. In addition, the internal networks 126 are connected to an external network 130 (e.g., the Internet or other public network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 128 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the server storage systems 122 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be approximately 4,000 computing systems per data center, with at least some of those computing systems being host computing systems that may each host fifteen virtual machines, and/or with some of those computing systems being server block data storage systems that may each store several volume copies. If each hosted virtual machine executes one program, then such a data center may execute as many as sixty thousand program copies at one time. Furthermore, hundreds or thousands (or more) volumes may be stored on the server block data storage systems, depending on the number of server storage systems, size of the volumes, and number of mirror copies per volume. It will be appreciated that in other embodiments, other numbers of computing systems, programs and volumes may be used.

Figure 2:
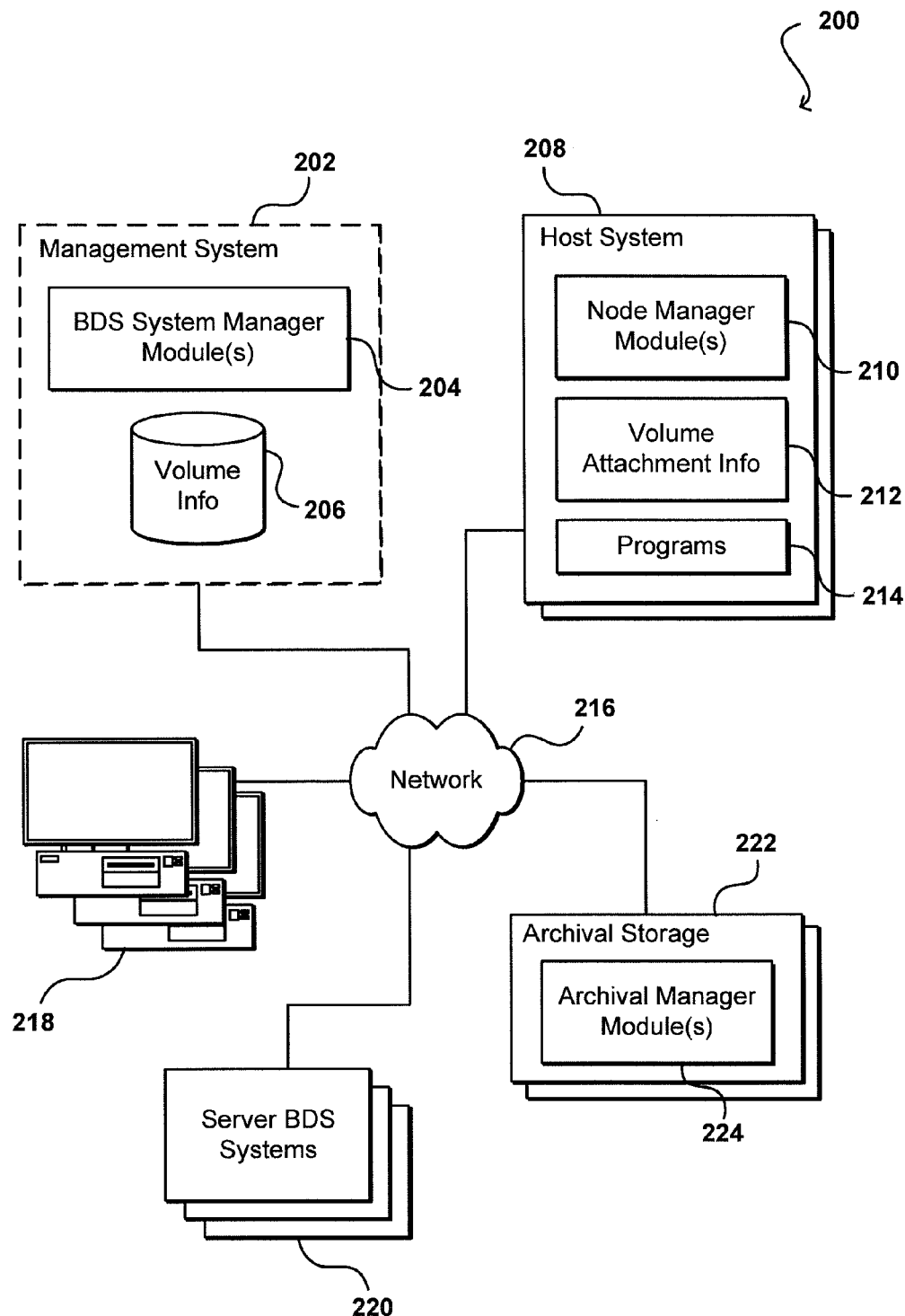
FIG. 2 illustrates an example separation of management and host components that can be used in accordance with various embodiments.

FIG. 2 illustrates an example environment 200 including computing systems suitable for managing the provision and use of reliable non-local block data storage functionality to clients that can be used in accordance with various embodiments. In this example, a management system 202, such as one or more server computers including one or more externally-facing customer interfaces, is programmed to execute an embodiment of at least one BDS System Manager module 204 to manage provisioning of non-local block data storage functionality to programs executing on host computing systems 208 and/or on at least some other computing systems 218, such as to block data storage volumes (not shown) provided by the server block data storage systems 220. Each of the host computing systems 208 in this example also executes an embodiment of a Node Manager module 210 to manage access of programs 214 executing on the host computing system to at least some of the non-local block data storage volumes, such as in a coordinated manner with the BDS System Manager module 204 over a network 216 (e.g., an internal network of a data center, not shown, that includes the computing systems 202, 208, 220, and optionally at least some of the other computing systems 218). In other embodiments, some or all of the Node Manager modules 210 may instead manage one or more other computing systems (e.g., the other computing systems 218).

In addition, multiple server block data storage systems 220 are illustrated that each can store at least some of the non-local block data storage volumes (not shown) used by the executing programs 214, with access to those volumes also provided over the network 216 in this example. One or more of the server block data storage systems 220 may also each store a server software component (not shown) that manages operation of one or more of the server block data storage systems, as well as various information (not shown) about the data that is stored by the server block data storage systems. Thus, in at least some embodiments, the server computing system 202 of FIG. 2 may correspond to the computing system 124 of FIG. 1, one or more of the Node Manager modules 108 and 112 of FIG. 1 may correspond to the Node Manager modules 210 of FIG. 2, and/or one or more of the server block data storage computing systems 220 of FIG. 2 may correspond to server block data storage systems 122 of FIG. 1. In addition, in this example embodiment, multiple archival storage systems 222 are illustrated, which may store snapshot copies and/or other copies of at least portions of at least some block data storage volumes stored on the server block data storage systems 220. The archival storage systems 222 may also interact with some or all of the computing systems 202, 208, and 220, and in some embodiments may be remote archival storage systems (e.g., of a remote storage service, not shown) that interact with the computing systems over one or more other external networks (not shown).

The other computing systems 218 may further include other proximate or remote computing systems of various types in at least some embodiments, including computing systems via which customers or other users of the block data storage service interact with the management and/or host systems. Furthermore, one or more of the other computing systems 218 may further execute a PES System Manager module to coordinate execution of programs on the host computing systems 208 and/or other host computing systems 218, or the management system 202 or one of the other illustrated computing systems may instead execute such a PES System Manager module, although a PES System Manager module is not illustrated in this example.

In the illustrated embodiment, a Node Manager module 210 is executing in memory in order to manage one or more other programs 214 executing in memory on the computing system, such as on behalf of customers of the program execution service and/or block data storage service. In some embodiments, some or all of the computing systems 208 may host multiple virtual machines, and if so, each of the executing programs 214 may be an entire virtual machine image (e.g., with an operating system and one or more application programs) executing on a distinct hosted virtual machine computing node. The Node Manager module 210 may similarly be executing on another hosted virtual machine, such as a privileged virtual machine monitor that manages the other hosted virtual machines. In other embodiments, the executing program copies 214 and the Node Manager module 210 may execute as distinct processes on a single operating system (not shown) executed on a single computing system 208.

The archival storage system 222 is operable to execute at least one Archival Manager module 224 in order to manage operation of one or more of the archival storage systems, such as on behalf of customers of the block data storage service and/or of a distinct storage service that provides the archival storage systems. In other embodiments, the Archival Manager module(s) 224 may instead be executing on another computing system, such as one of the other computing systems 218 or on the management system 202 in conjunction with the BDS System Manager module 204. In addition, while not illustrated here, in some embodiments various information about the data that is stored by the archival storage systems 222 may be maintained in storage for the archival storage systems or elsewhere.

The BDS System Manager module 204 and Node Manager modules 210 may take various actions to manage the provisioning and/or use of reliable non-local block data storage functionality to clients (e.g., executing programs), as described in greater detail elsewhere. In this example, the BDS System Manager module 204 may maintain a database 206 that includes information about volumes stored on the server block data storage systems 220 and/or on the archival storage systems 222 (e.g., for use in managing the volumes), and may further store various other information (not shown) about users or other aspects of the block data storage service. In other embodiments, information about volumes may be stored in other manners, such as in a distributed manner by Node Manager modules 210 on their computing systems and/or by other computing systems. In addition, in this example, each Node Manager module 210 on a host computing system 208 may store information 212 about the current volumes attached to the host computing system and used by the executing programs 214 on the host computing system, such as to coordinate interactions with the server block data storage systems 220 that provide the primary copies of the volumes, and to determine how to switch to a mirror copy of a volume if the primary volume copy becomes unavailable. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage.

An environment such as that illustrated with respect to FIGS. 1-2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount allows them to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can perform various functionality, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

As discussed above, there can be a number of different situations where the provisioning and/or allocation for a customer against a shared resource may no longer be sufficient and/or optimal. For example, the customer might require a greater amount of storage capacity or bandwidth, such that at least one additional physical resource component, device, or instance should be added to the allocation for the customer. In other cases, the overall allocation for the customer might be sufficient, but the usage by the customer might be uneven such that a portion of the allocation is getting the most usage, whereby the system might not be able to provide the guaranteed bandwidth and/or rate of IOPS.

Conventional systems enable customers to increase the storage capacity, bandwidth, and/or rate of IOPS by provisioning additional resources, such as by adding additional storage devices to a customer allocation (e.g., adding partitions or spindles to a customer data volume). Such addition, however, is not an insignificant task. For example, storing customer data to a data volume using a conventional approach typically involves using data striping or another such technology for segmenting logically sequential data. For purposes of simplicity of explanation data striping will be used herein with various examples for data distribution, but it should be understood that this is merely for convenience and should not be interpreted as narrowing the scope of the embodiments. In one approach where there are five disk spindles to be used to store the customer data for the data volume, a data stripe size (e.g., 128 kb) is selected along with a modulus scheme (e.g., RAID or LVM). The data stripes then are relatively evenly assigned to the spindles, such as by using a round robin approach wherein each spindle gets every fifth data stripe (e.g., the first stripe goes to spindle one, the second stripe goes to spindle two, and so on, with the sixth stripe going back to spindle one). Such a randomizing approach works well in many situations, as the data accessed by a customer generally will be split across the spindles in a random fashion such that each spindle processes a substantially similar number of requests.

In some cases, however, the customer can have an unusual I/O pattern that conflicts with the frequency of the selected modulus, or that otherwise places significantly more burden on certain spindles. In a traditional striping approach, there is no easy way to compensate for this usage pattern without redoing the striping scheme and rewriting the data to the spindles. Determining an customized striping approach for the irregular usage pattern can be difficult, expensive, and time-consuming, such that traditional approaches typically solve the problem by simply adding more spindles to the data volume. The same (or a similar) striping approach then can be used to write the data relatively evenly across the increased number of spindles.

Figure 3A:
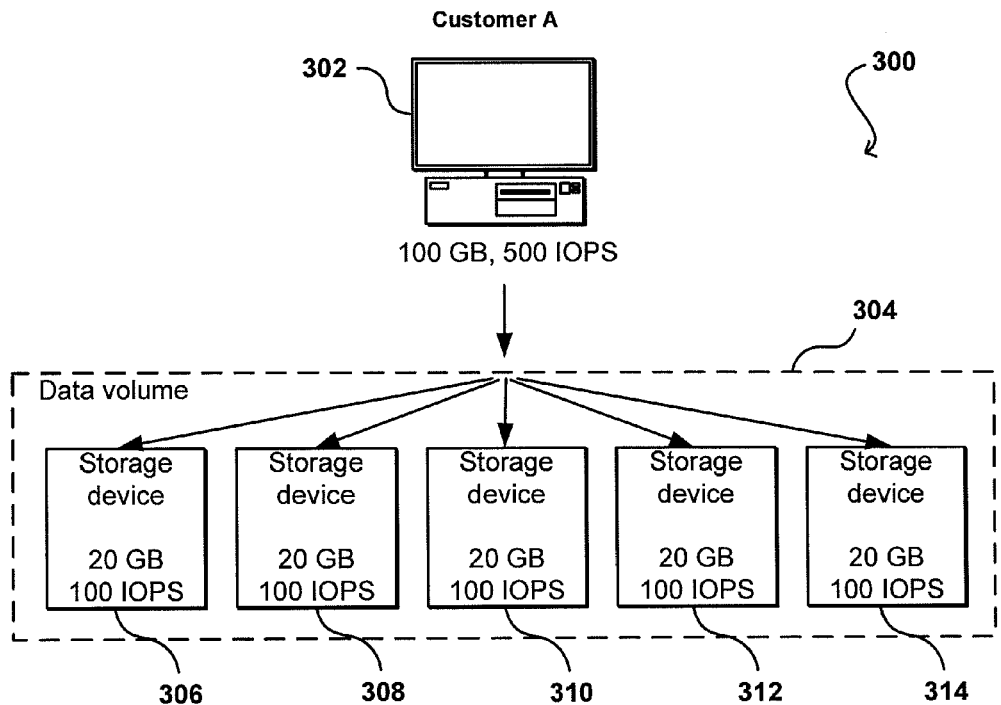
FIGS. 3(a) and 3(b) illustrate how customer data might be partitioned across storage devices (such as spindles) for a data volume, and how actual customer usage might occur in accordance with various embodiments.

Such an approach still can be relatively expensive and time consuming. For example, consider the situation 300 of FIG. 3(a), wherein a customer 302 has a 100 GB data volume 304 with an IOPS guarantee of 500 IOPS. The data volume contains five storage devices 306, 308, 310, 312, 314 (e.g., spindles) each capable of providing 100 IOPS, and each storing approximately 20 GB of the data volume. For typical usage, such a distribution will offer the amount of storage, bandwidth, and IOPS that the customer requires. In some embodiments, the five storage devices are logical devices each corresponding to a data partition, which can correspond to a single device, portion of a device, or multiple devices.

Figure 3B:
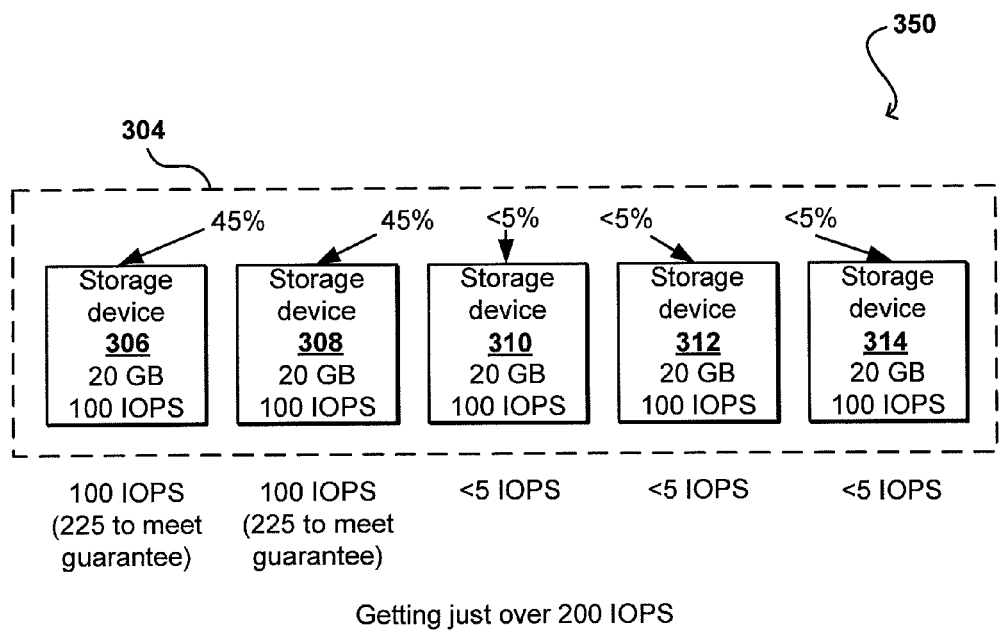

In the situation 350 of FIG. 3(b), however, the actual usage of the customer is disproportionately directed towards only a portion of the storage devices. In this example, two of the storage device 306, 308 are each getting approximately 45% of the customer's requests, while the other storage devices 310, 312, 314 are each getting less than 5% of the customer's requests. At this rate of requests, the busier storage devices 306, 308 would each have to provide about 225 IOPS in order for the customer to obtain the guaranteed rate of IOPS. Since the devices can only process at 100 IOPS each, the customer would be getting just over 200 IOPS, well short of the 500 IOPS guarantee.

Figure 4A:
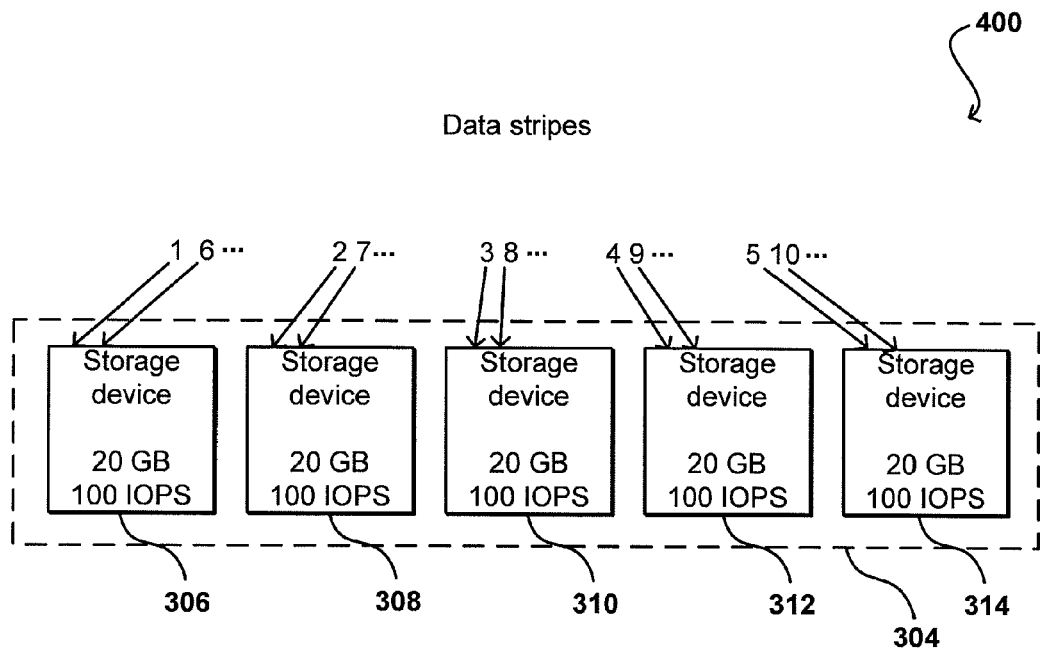
FIGS. 4(a) and 4(b) illustrates distributing data across multiple storage devices, and redistributing the data across additional devices.
Figure 4B:
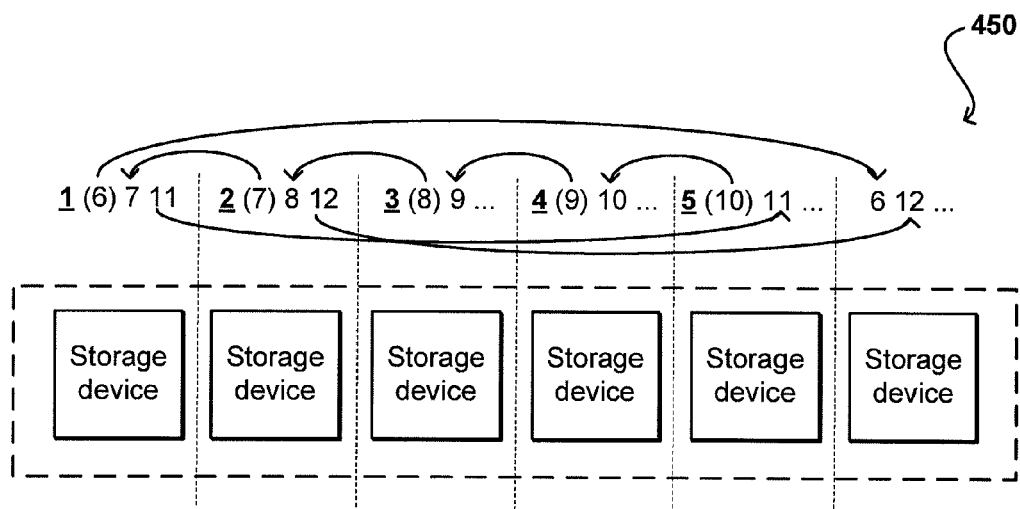

One way to compensate for the drop in IOPS is to add another device to the customer's data volume 304. As discussed, however, such an approach can be very expensive and time consuming. Consider the situation 400 illustrated in FIG. 4(*a*), where every fifth data stripe is initially directed to each of five storage devices (e.g., stripes 1, 5, and 11 on the first storage device, and stripes 2, 6, and 12 on the second storage device). FIG. 4(*b*) illustrates the situation 450 where a sixth storage device is added to the storage volume to compensate for the drop in IOPS (or for any other appropriate reason discussed herein). Using a striping approach in accordance with one embodiment, each spindle could now get every sixth data stripe. As illustrated in FIG. 4(*b*), however, such a process can involve moving almost every single data stripe for the volume. In FIG. 4(*b*), it can be seen that stripes 1-5 can remain at the same positions on the same spindles, assuming the same striping order is utilized. The sixth stripe would need to be moved from the first storage device to the new storage device. The first storage device would now need to store the seventh data stripe, which would need to be moved from the second storage device. By extrapolating out this process, it can be seen that only the first five stripes in this example remain at the same positions, with substantially all the other stripes needing to be moved, either to other spindles or, in some cases, different locations on the same spindle. Thus, a long copying process can be required to copy all the other data stripes to the appropriate spindle.

In cases where a simple modulus scheme is being used, the stripes can be moved without updating mappings as the mappings are implied by the modulus scheme. In cases where mappings are maintained at the stripe level, however, the mapping for each moved stripe must be updated. If using mappings for each data stripe, the number of stripes that need to be moved can be reduced, but there can be a large amount of memory required to hold mappings at the level of one mapping per stripe. It can be very expensive in the case of a 100 GB data volume, for example, to update and/or manage mappings for each 128 KiB data stripe. Further, the load on the system during such an update can be significant, such that it can be undesirable to perform such updates on the fly, or on an as-needed basis, as the availability of the data to the customer during the operations can be significantly reduced, and the customer might not be able to obtain satisfactory performance during this procedure.

To assist with data balancing and throughput issues, for example, a single logical data volume can be created (at least from the perspective of the customer) that is in fact distributed among one or more partitions using a data distribution scheme. Partitioning a single data volume across multiple devices enables more throughput than is possible from a single server or, more particularly, a single spindle in certain embodiments. If a single spindle can deliver 100 IOPS and the customer wants a 1000 IOPS volume, a single volume can be created using at least 10 partitions, with each partition mapping to a single spindle (or other such physical storage device). A data distribution mechanism, such as a striping pattern or hashing mechanism, can be selected that enables logical offsets in the volume to be mapped to actual partitions as well as offsets within a partition. If the customer's I/O pattern does not mesh well with the distribution scheme, however, a significantly disproportionate number of I/Os might flow to a single partition, whereby the system can attempt to dynamically rebalance or otherwise address the capacity or functionality of the data volume. In at least some embodiments, the mapping from logical volume offset to partition would have to be changed such that the I/Os were spread more uniformly (or so that more spindles were brought to bear in total) in order to deliver the requisite number of IOPS. As discussed above, however, moving individual stripes or repartitions using conventional approaches can be an expensive and time-consuming process that does not provide for a dynamic and fine-grained balancing of workload across partitions.

Systems and methods in accordance with various embodiments address at least some of these and other deficiencies in existing resource management approaches by utilizing a number of what will be referred to herein as "logical areas." A logical area refers to a logical or "virtual" grouping of data, where the mappings of data within a logical area do not change regardless of the location of the virtual area with respect to physical devices, partitions, and/or a data volume. Each logical area can be assigned to any appropriate resource instance, such as by being stored to any appropriate partition or storage device of a customer data volume. Further, each storage device can store any number of logical areas (up to the capacity of the storage device), and there can be any arbitrary and/or uneven distribution of logical areas across the storage devices of the data volume. Further, each logical area can act as a storage device for purposes of the modulus, as data distribution can be performed across the logical areas instead of across the storage devices or partitions.

FIG. 5(*a*) illustrates a situation 500 where a customer has 100 GB of data 502 (or at least a guaranteed capacity of up to 100 GB). The system can select an appropriate number of logical areas to be used to store the data, in this example initializing 100 logical areas 504 to store the data, with each logical area designated to store up to (or approximately) 1 GB of the customer data. The selected modulus can distribute stripes (or hashes, etc.) across the 100 logical areas, with the first logical area in a round-robin approach getting the first data stripe, the one-hundred and first data stripe, the two-hundred and first data stripe, etc. A mapping can be generated that determines which data stripes are stored to each logical area. Utilizing such logical areas can enable a common modulus to be used to map from stripe to logical area, requiring a relatively small amount of memory, while providing enough flexibility to move less than substantially all the data when an adjustment is made, such as a change in the number of resources across which the logical areas are to be distributed. The number of logical areas used can vary between embodiments, as it can be desirable to enable the distributions to be as accurate as possible by using smaller logical areas, enabling the allocation across the physical resources to be finely tuned. This desire can be balanced, however, with the desire to prevent the management of the logical areas from becoming unnecessarily complicated and/or expensive by using a large number of logical areas, which also can result in a large amount of metadata to be maintained, referenced, and updated.

As illustrated in FIG. 5(*b*), the logical areas then can be distributed to the various storage devices 508, 510, 512, 514, 516 (or partitions) of a customer data volume 506. In this example the logical areas are distributed substantially evenly across the storage devices, using any appropriate approach such as a round robin approach. A second set of mappings is generated (either separately or as part of the first set of mappings) which indicates which storage device is associated with each logical area. It should be understood that a relatively small number of logical areas is shown for purposes of simplicity of explanation, and that the number of logical areas may in fact be greater (or fewer) than that shown.

As illustrated in FIGS. 5(*c*)-5(*e*), utilizing logical areas can simplify the processes for moving data when necessary. If a percentage of data needs to be moved from one storage device to another, for example, the system can select the appropriate number of logical areas to move. In some cases, this might involve only a few logical areas, and for certain systems might only involve one logical area at a time. When updating the mappings as a result of the move, only the second set of mappings needs to be updated to identify the new locations (e.g., partitions) of the moved logical areas. Such a process can reduce thousands of mapping changes down to only a few changes for the moved logical areas. The first set of mappings for data inside each logical area will not change as a result of the move. Further, performing an action such as adding or removing a storage device or partition will only involve moving a selected number of logical areas, and will not involve re-striping almost the entire data volume.

As discussed in the example of FIG. 3(b), there might be a situation where the usage pattern of the user causes an uneven distribution of work across the data partitions. This can result in an inability to provide the guaranteed rate of IOPS, and/or can create problems with bandwidth as the one or two partitions receiving the bulk of the requests can create a bottleneck in the data volume.

Figure 5A:
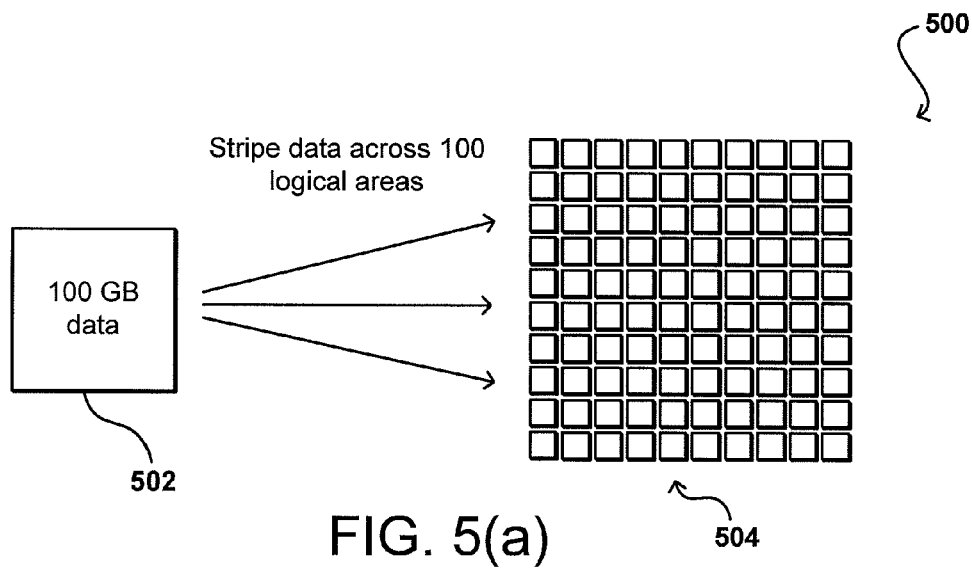
FIGS. 5(a)-5(e) illustrate approaches for distributing data across logical units, and moving units across partitions in accordance with various embodiments.
Figure 5B:
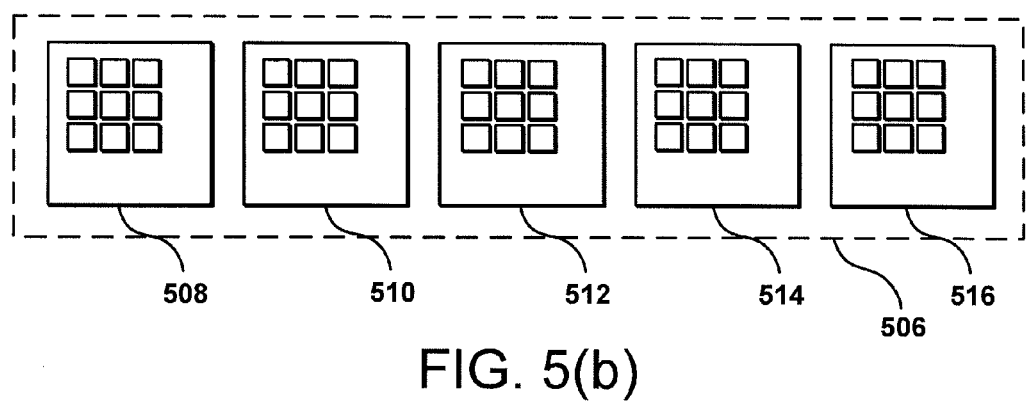
Figure 5C:
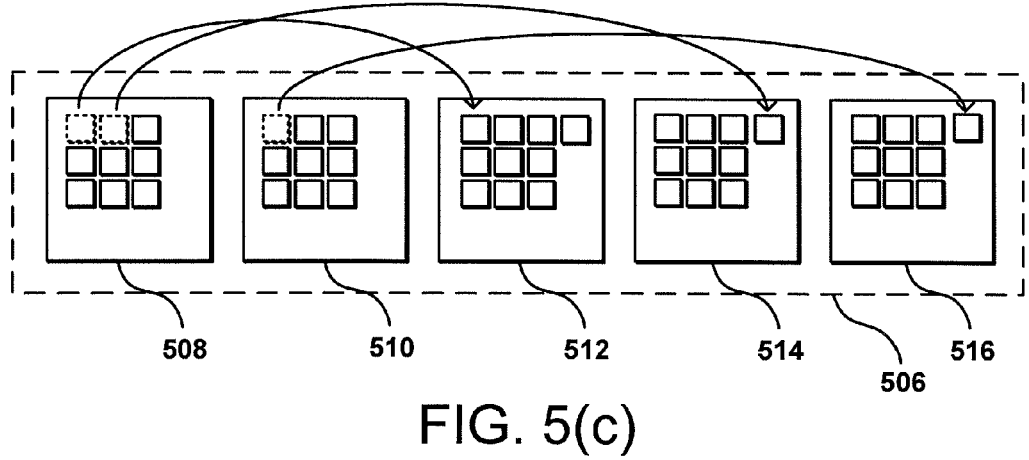

FIG. 5(c) illustrates an approach that can be used in accordance with various embodiments, wherein the system can move logical areas between existing partitions in the data volume. In this example, the first partition 508 is the busiest partition based on the customer's current usage pattern. In order to rebalance the load, the system can dynamically adjust the location of one or more logical areas. In one embodiment, a resource monitor of a control plane monitors the load on each partition, and can determine that the first partition is at, near, or over capacity such that at least one logical area should be moved to another partition. The control plane can include one or more balancing algorithms to determine how many logical areas to move based on the current usage pattern. For example, if a partition can provide up to 100 IOPS and the partition would have to provide 200 IOPS to meet the guaranteed rate, the algorithm can decide to move at least about half of the current number of logical areas to another partition. In more complex algorithms, the system can determine how many IOPS are hitting each logical area, and can move a number of specific logical areas in order to reduce the load on the current partition to an amount that can be provided by that partition. In some embodiments, the algorithm will select a set of logical areas that will enable the partition to meet its guarantees, while also requiring the fewest number of logical areas to be moved to another partition, in order to minimize the overall amount of data movement.

In the example of FIG. 5(c), the algorithm in the control plane has determined that the number of partitions is sufficient for the current customer usage pattern, but that some of the work should be redistributed. In this example, a control plane component sends at least one request to move one logical area from the first partition 508 to the third partition 512 and another logical area moved to the fourth partition 514. The control plane can also, as part of the same request or a different request, cause a logical area to be moved from the second partition 510 to the fifth partition 516. As can be seen, there can be a different number of logical areas on each partition, and the number of logical areas moved can differ between partitions. One significant advantage to such an approach is that only three of the fifteen logical areas illustrated in the figure need to be moved, as opposed to all but a few data stripes. Another significant advantage is that only three mappings need to be updated, regardless of the amount of data in each logical unit.

In some cases, however, simply moving logical areas between partitions will be insufficient to meet certain guarantees. In some cases, the size of one or more partitions can be increased up to a maximum allowable partition size (e.g., the capacity of a spindle or flash drive). If a customer requests to increase the storage capacity of the data volume beyond the allowable capacity of the existing partitions, however, it can be necessary to add at least one additional partition. Similarly, a customer requesting an increase in bandwidth or IOPS beyond the capacity of the existing partitions may require one or more additional partitions to be added. Further, the usage pattern of the customer might trigger a system to automatically add one or more partitions in order to meet a guarantee or minimum level of service. For example, the customer might not exceed a maximum number of requests, but if those requests are very expensive (i.e., take a long time to process and/or transmit a lot of data) then the bandwidth and/or rate of IOPS may suffer such that it can be desirable to spread the operations out over more physical devices. Various other usage patterns exist that can cause similar problems as should be apparent.

Similarly, when usage patterns change it is possible that the data volume can meet the guaranteed or minimum levels of service with fewer partitions. During certain times of the day, for example, a user might not access the data volume as often, such as hours when a customer business is closed. During these times, it can be desirable to decrease the number of data volumes in order to minimize the number of physical devices being used and/or maximize the usage of existing devices, in order to conserve resources and lower costs for the provider of the data volume. For conventional processes where each data stripe (or similar data block) must be moved individually and remapped, such dynamic and frequent movement of data can be undesirable or impractical, as a significant amount of time and resources would be needed to move the data for the various customers. By utilizing logical areas, however, the process becomes much faster and less complicated, which allows for frequent and dynamic movement of the logical areas.

Figure 5D:
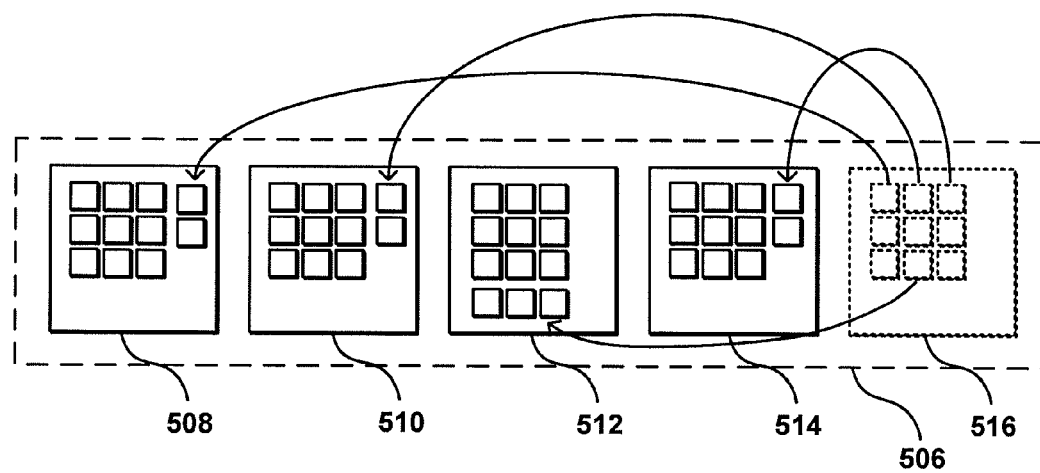

For example, FIG. 5(d) illustrates a situation wherein the system (or a user or other such entity) determines that the number of partitions in the customer data volume should be decreased. In this example, the partition 516 to be eliminated contains nine logical areas (which each may contain any permissible amount of data). In order to remove the partition, the nine logical areas are moved among the four remaining partitions 508, 510, 512, 514. Because only nine elements are being moved, the overhead for dynamically reducing the number of partitions can be minimal. In some embodiments, a round robin or similar approach is used to distribute the logical areas across the remaining partitions. In other embodiments, the system determines the usage of each partition and attempts to distribute the logical areas in a way that balances the load or usage across the remaining partitions. For example, a relatively frequently accessed partition might get only one or two logical areas, or might not get any additional logical areas. A partition that is relatively infrequently accessed might get a majority of the logical areas, or even all of the logical areas. Many other such approaches can be used to distribute the logical areas as well within the scope of the various embodiments.

A similar process can be used to increase the number of partitions in a data volume. As discussed, the number of partitions can be increased in some embodiments due to the usage pattern of the customer, whereby at least one guarantee or minimum level of service is unable to be met (or at least impractical to meet) using the current number of partitions. In other embodiments, the customer might request another partition, or an increase in at least one aspect that requires another partition. For example, the customer might have a 100 GB data volume that is delivering 500 IOPS, and request to upgrade to a 150 GB data volume delivering 800 IOPS. Conventional techniques could not dynamically process such a request, particularly while enabling the customer to continue to utilize the data volume. In another example, the customer might want to keep the 100 GB volume with 500 IOPS, but would like to increase the bandwidth. If, for example, each spindle is delivering 100 megabytes per second (mbps) of bandwidth, and the customer wants 200 mbps, the customer is going to have to use at least two spindles, regardless of the amount of storage or IOPS needed. A number of partitions then could be spread across multiple physical hard drives in order to increase the bandwidth.

Figure 5E:
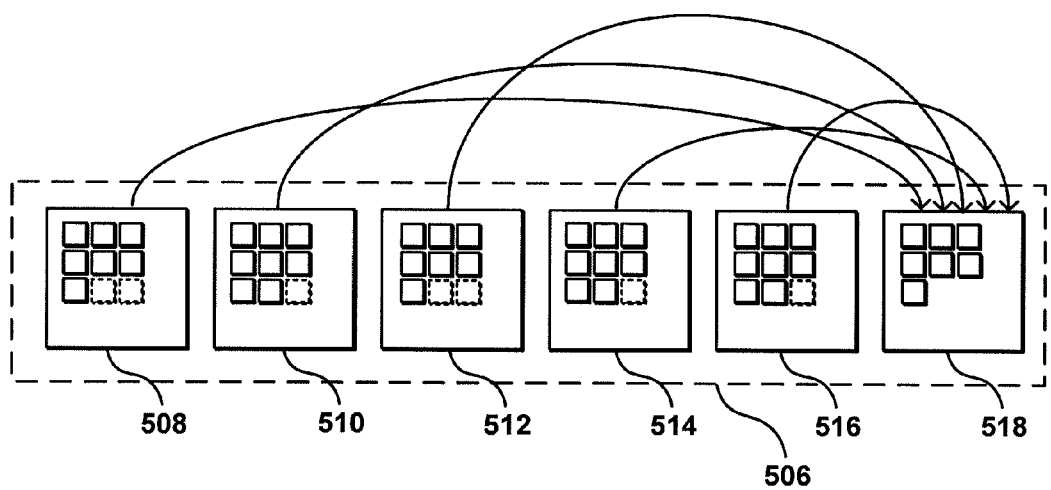

As illustrated in the example of FIG. 5(e), a sixth partition 518 can be added to the data volume for a customer. The sixth partition can be added for any appropriate reason discussed herein, such as a usage exceeding a specified threshold or a customer manually requesting an increase. In one embodiment, components of a control plane cause a new partition to be added to the data volume. One or more algorithms in the control plane can determine information such as how many logical areas are on each partition, the usage of each partition, and even the usage of each logical area. Based on this and/or other such information, the control plane can select one or more logical areas to be moved to the new partition. In some cases, the system will move a substantially equal number of logical areas from each existing partition. In other embodiments, the system can move uneven numbers of logical areas from the partitions based at least in part upon the usage information discussed above. In this example, the first partition 508 is determined to be the most accessed partition, with the heaviest load, whereby the control plane algorithm determines to move two logical areas to the new partition 518. In some embodiments the logical areas to be moved can be selected at random, while in other embodiments the logical areas can be selected based on usage in order to attempt to balance the load across the partitions.

In this example, the third partition 512 is also determined to have a heavier load than the other partitions 510, 514, 516, such that the control plane causes two logical areas to be moved from the third partition. The system in this example determines to move one logical area from each of the remaining partitions 510, 514, 516, although in some cases one or more partitions might not have any logical areas moved to the new partition.

As can be seen, the number of logical areas in each partition after the movement can be uneven (although in some embodiments the system will attempt to balance the number of logical areas across the partitions). Further, the number of logical areas in the new partition can be different than the number of partitions in any of the existing partitions. In some embodiments, the system can attempt to move the fewest number of logical areas to the new partition as possible while still balancing the load. For example, the system might select the three most accessed logical areas and move only those logical areas to the new partition if the resulting load will be substantially balanced across the volume. In other embodiments, the system might attempt to move as many infrequently accessed logical areas to the new partition as possible, as the moving of those infrequently access areas will have little impact on customer performance since the customer can be unlikely to make requests involving those areas. Various other approaches can be used as well within the scope of the various embodiments.

In some embodiments, the system can attempt to balance both the load and the number of logical areas (i.e., the amount of data stored) across the various partitions. For example, even if the load across the various partitions is substantially balanced, the system might swap logical areas between partitions in order to attempt to balance the number of logical areas between partitions. For example, if a first partition has more logical areas than a second partition, the system might attempt to swap a smaller number of logical areas on the first partition with a greater number of logical areas on the second partition, where the partitions being swapped have substantially the same load. As usage patterns change and the data stored in each partition changes, the system in some embodiments can dynamically move logical areas in attempt to make the system as balanced as possible.

Thus, a system can dynamically adjust the location of the various logical areas across the partitions of a data volume with minimal impact on performance and with substantially no need to temporarily deny access to the data volume. In some embodiments, a monitoring component of a control plane can periodically or continually send messages into (or otherwise obtain information from) the data plane in order to determine the performance of the data volume as a whole and/or the performance or usage of each partition. The system can have one or more rules, policies, thresholds, criteria, or other such aspects which, when applied or met, can trigger the control plane to adjust the location of one or more logical areas. In some embodiments the system will attempt to rebalance the load within the data volume before adding additional partitions. In other embodiments, new partitions are added whenever certain usage patterns or thresholds are met. In some embodiments, a user noticing a degradation in performance can manually trigger an investigation, rebalancing, or other such process. In some embodiments, the user might be provided with the monitoring information such that the user can determine when to add or remove partitions. Various other approaches can be used as well within the course of the various embodiments.

Figure 6A:
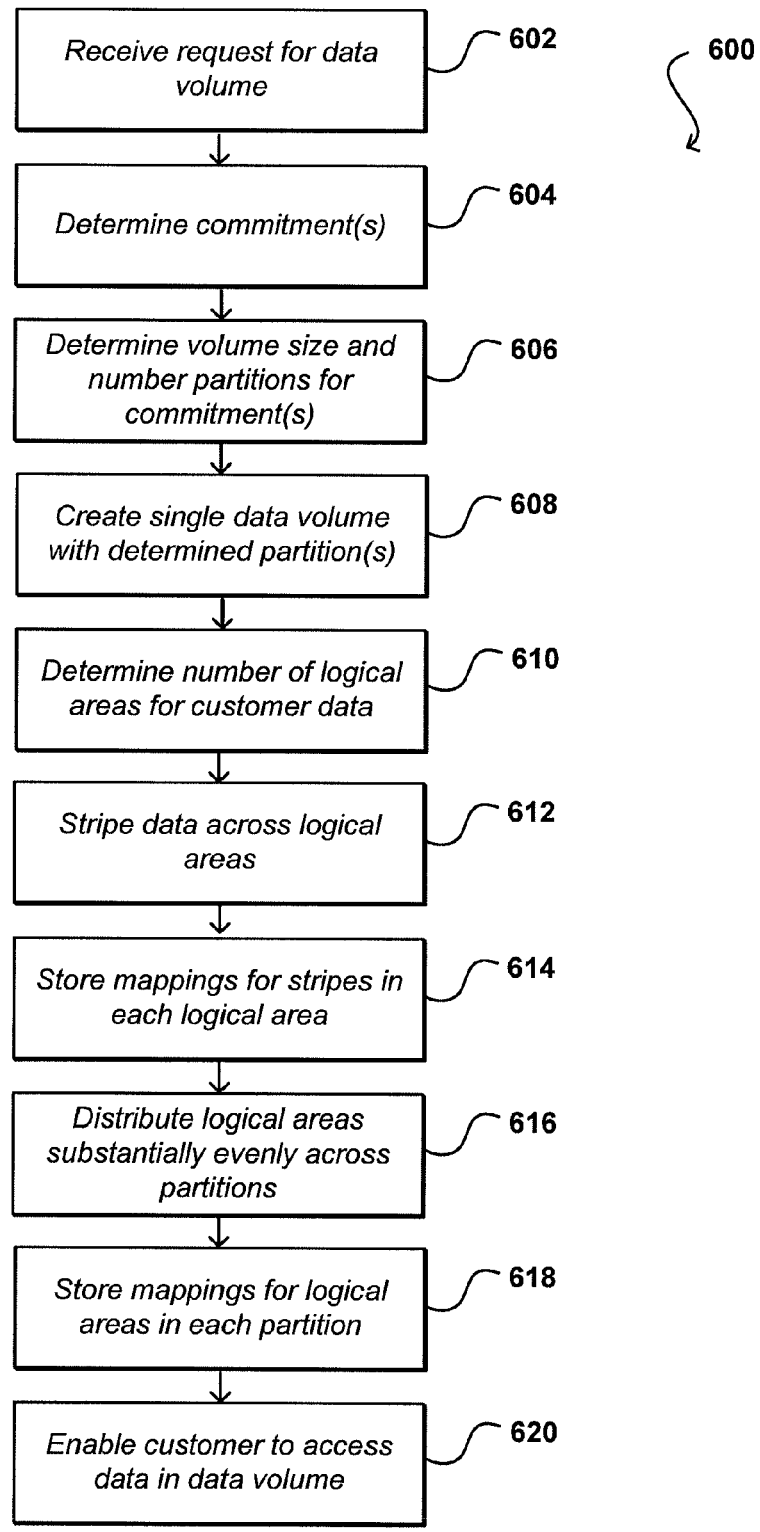
FIGS. 6(a) and 6(b) illustrate an example process for distributing and redistributing logical units of data in a data volume that can be used in accordance with various embodiments.

FIG. 6(a) illustrates a first portion 600 of an example process that can be used to set up a data volume for a customer in accordance with at least one embodiment. It should be understood that, unless otherwise specified, the various methods discussed herein can include additional, fewer, and/or alternative steps performed in similar or different orders, or in parallel, within the scope of the various embodiments. Further, the process can be performed for any appropriate components or elements, such as at least one data instance, repository, or other such data source in a data environment, here a data plane, using a control plane or a similar data control application or service. While the term "customer" is used herein to refer to the "owner" of specific data, or a data store or instance hosted by the system, it should be understood that the term customer is used merely for convenience, and that any appropriate user or developer can be allowed to access the control plane and data plane in the various embodiments.

In this example, a request for a data volume is received 602, such as by a customer sending a Web services through an appropriate API of a control plane. In other embodiments, the request can be generated by a module in the control plane in response to an event or other specified occurrence. One or more commitments for the data volume can be determined 604, such as by analyzing the request (or information associated with the request) to determine a desired storage capacity, guaranteed rate of IOPS, minimum bandwidth guarantee, or other such commitment or quality of service level. In some embodiments, the customer will first agree to various pricing and commitment levels whereby information will be stored to at least one data store accessible to components of the control plane. When a request for a data volume (or other such request) is subsequently received from the customer, the control plane components can check the information in the data store to ensure that the data volume meets all guarantees.

Based at least in part upon the determined commitment information, the system (e.g., a module of the control plane) can determine an appropriate size for the data volume, as well as an appropriate number of partitions for that volume 606. As discussed, this can include a number of physical storage devices (e.g., spindles or flash drives) able to provide the amount of bandwidth and/or IOPS, with each storage device potentially corresponding to a unique partition in the data volume. Once the volume parameters are determined, the control plane can make one or more calls into the data plane in order to create the single data volume for the customer and generate the determined number of partitions 608, such as by provisioning the user on a determined number of physical devices.

The control plane also can determine a number of logical areas to use for the customer data in the data volume 610. The number of logical areas can be fixed for each data store, or can vary using any appropriate function or algorithm. For example, the number of logical areas can be a function of the number of partitions and/or the size of the data volume. The location of the logical areas with respect to the various partitions can be determined, and the customer data can be striped (or otherwise distributed in chunks of a determined size or other such aspect) across the partitions using an appropriate distribution mechanism 610, such as a round-robin or other striping approach, hashing mechanism, etc. The mappings for the stripes stored in each logical area can be stored using a first storage mechanism 612. The logical areas also can be distributed substantially evenly (or unevenly) across the various partitions 616, and those mappings can be stored using a second storage mechanism 618, such as by using a look-up table or other such mapping mechanism. In some embodiments each logical area might be a partition unto itself, but in many embodiments multiple areas will be grouped into each partition to reduce the number of connections for a particular volume. Further, in some embodiments the first and second storage mechanisms may be portions of the same storage mechanism. Once the data is stored and the mappings made available, a customer can be allowed to access the data through an interface of the data plane 620.

Figure 6B:
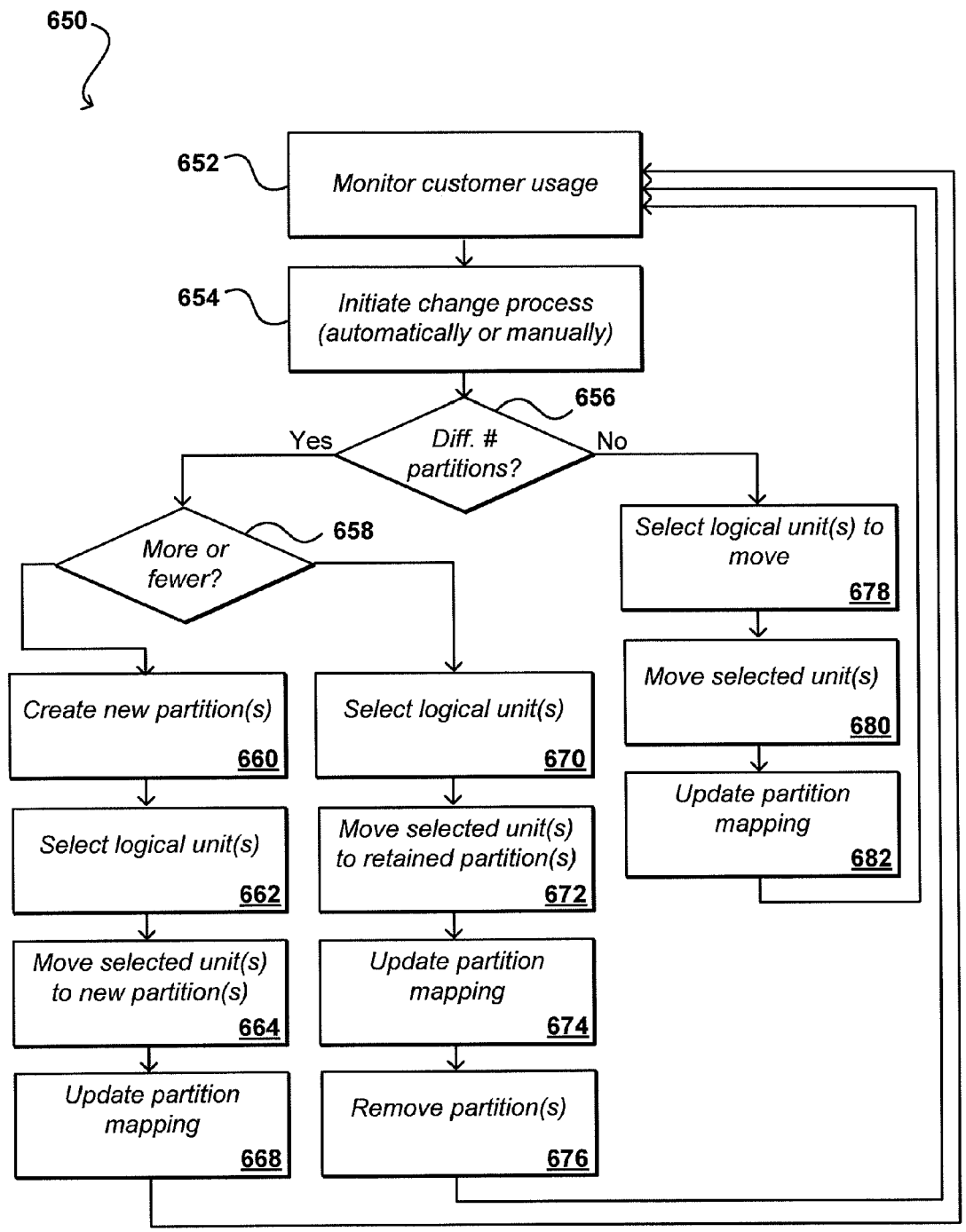

FIG. 6(*b*) illustrates a second portion 650 of the example process for adjusting the data volume once the data volume is configured and the customer has access to the data volume. In this example, the system can monitor the usage of the data volume by the customer 652. In some embodiments, this involves one or more monitoring components of the control plane calling into the data plane to determine the load (or other such usage information) on each partition of the data volume. The control plane can compare this usage information to the stored parameter values for the data volume (e.g., minimum rate guarantees or other such aspects) to determine whether an adjustment should be made. Various algorithms or approaches can be used to determine when an adjustment should be made as discussed herein, such as to make a change when the customer usage hits one of a number of criteria or thresholds, or to make a change when a prediction algorithm indicates that the customer usage likely will hit one of these values within a specified period of time. In some embodiments, a customer, user, application, or other such source also can manually request an adjustment in the data volume. For example, a customer or application might determine that a significant amount of additional data needs to be stored, and may request an increase in the size of the data volume.

Whether the determination to change is made manually or automatically, a request and/or task can be generated and/or received to initiate a change to the data volume 654. At least one component of the control plane can analyze the request or task to determine the necessary actions to be taken in the data plane. In some embodiments, this can involve a workflow being instantiated to direct the appropriate changes. In one embodiment, the system first determines whether the number of partitions needs to be changed, or whether the adjustment can be made using the current partitions 656. If the number of partitions needs to change, a determination can be made as to whether the number of partitions needs to increase or decrease 658. If the number of partitions is to increase, the control plane can cause a new partition to be created 660, such as by provisioning the customer on a new storage device. The control plane can select specific logical units from one or more of the existing partitions that are to be moved 662, and can move the selected logical unit to the new partition 664. As discussed, these partitions can be selected at random, or specific logical units can be selected based at least in part upon the customer usage with respect to those logical units. As the logical units are moved, the mappings for the units across the various partitions can be updated 668.

If the update instead requires at least one partition to be removed from the data volume, the control plane components can select the logical units from each partition to be removed 670, and can move each of those units to a specified partition to be retained after the change 672. As discussed, the logical units can be distributed substantially evenly or according to any other appropriate distribution approach. As the logical units are being moved, the mappings for the logical units across the partitions can be updated 674. Once the logical units are moved and the mappings updated, the partition(s) can be removed.

For some changes, the adjustment can be made without modifying the number of partitions. As discussed above, logical units can be shifted between partitions for uneven or irregular customer usage patters, or for any other appropriate reason discussed or suggested herein. For example, logical units might be shifted from a highly accessed partition to a seldom utilized partition in order to rebalance the load across the partitions. In such a case, the control plane components can select one or more logical units to move 678, and can cause those units to be moved to the selected partition(s) 680. The partition mapping can be updated appropriately 682.

For each of these situations, it can be seen that the data can be moved or redistributed in any appropriate manner with a minimal amount of remapping and management, as the mapping updates pertain to the relatively small number of logical areas instead of the relatively large number of data stripes (or other data chunks). Further, since only a relatively small percentage of the data (e.g., one logical unit) is moved at any time the data volume can remain available to the customer with little effect on the use of the data volume by the customer.

In some embodiments, the decision to consolidate a customer onto fewer devices can be triggered by any of a number of events. For example, the control plane can communicate with each resource instance periodically in order to determine when a change in available capacity, such that consolidation might be possible. In some embodiments, when there is a reduction in commitments for a resource instance, such as when a customer lowers a committed rate or no longer utilizes the resource, a task can be established in the job queue of the control environment to check the commitments in an Admin data store, or other location, to determine if any consolidation is possible. A similar approach could be utilized whenever a new resource instance is provisioned in the data environment, such that a new record would be stored in the control environment, for example. Various other approaches can be used as well, such as to periodically analyze the commitment information stored in the control environment to determine possible approaches to consolidation. In cases where a user only requires a temporary increase or decrease in commitments, however, the system might not decide to consolidate in order to minimize the copying of data, mapping updates, etc. Thus, certain criteria (e.g., commitment usage, length of time at the current commitment level, etc.) can be utilized in various embodiments to determine whether to consolidate the resources for any given user.

It should also be noted that, in at least some situations, it is possible that one or more logical areas might have a disproportionately large amount of usage. In a worst case scenario, the usage of a particular logical area might cause a customer guarantee, quality of service, or other such aspect to be unable to be met. As discussed above, the inability to meet a guaranteed rate of IOPS, for example, often can be addressed by rebalancing or moving one or more logical areas for a data volume. In certain cases, however, one or more logical areas might cause a guarantee to be unable to be met regardless of the location of that data volume. In a specific example, if substantially all the customer requests are hitting one out of one hundred logical areas, and that logical area is on a spindle that can only provide 100 IOPS, then the maximum rate of IOPS that the customer can receive is 100 IOPS, regardless of the spindle on which the logical area is stored (assuming similar spindles).

In some embodiments, the system could perform a remapping of the stripes (or other pieces of data stored across the logical areas, such as chunks or blocks of data) across the logical areas. Such an approach can be resource intensive, however, and could still require a significant amount of metadata to be stored and/or updated to track the positions of each stripe. In other embodiments, the system can provide one or more "override" tables, or other such data storage mechanisms, whereby the locations of specific stripes could be stored. For example, each stripe could have a default location based on the modulus scheme used. If a portion (e.g., one quarter) of the stripes stored to a particular logical area are to be moved to one or more other logical areas, such as to meet a rate guarantee or for another appropriate reason, information for the moved stripe(s) could be stored to the override table. Thus, when a request is received, the override table could be checked first to determine whether a stripe needed to satisfy the request has been moved to another logical area. If not, the default location for the necessary stripe(s) can be used. Such an approach enables stripes to be moved between logical areas, where necessary, while reducing the amount of information (e.g., metadata) needed to track the moved stripes.

Further, in certain embodiments it is possible to configure the number of logical areas to correspond to essentially the number of stripes for the data volume, such that each logical area corresponds substantially to a single stripe of data. If an appropriate modulus scheme is used, the location of the logical area for each stripe can be determined using the default position according to the modulus. For any stripe or logical area that is moved, the new position could be tracked using a relatively small override table, reducing the amount of metadata that needs to be stored to track the positions of the various stripes. In some embodiments, metadata can be stored for substantially each stripe (or each logical area corresponding to the size of a stripe) such that the location can be independently tracked and determined.

As discussed, differing commitment levels can be allocated and/or data volumes modified for any of a number of reasons within the scope of the various embodiments. For example, a customer might explicitly request a change in resource commitment, such as by sending a Web services request to an appropriate API of a management system. A customer might also contact an administrator or other authorized user, who can submit such a request on behalf of the customer.

In various embodiments, the adjustments can be made due at least in part to detected changes in any of a number of different aspects of the resources in the data plane, as well as the usage of those resources. For example, a particular resource instance might be in an overload situation for longer periods of time than are acceptable, such as might be based upon specified criteria or thresholds. In such a situation, the system can decide to move at least one customer to a different instance, in order to reduce the average load on the often overloaded resource instance. In other embodiments, a customer might frequently exceed the committed rate, such that the system might decide to migrate the data volume for that customer to a resource with greater capacity.

In some cases, the way in which a customer's logical areas are distributed can depend at least in part upon the usage of other customers sharing at least a portion of the same resources. For example, if a disk has 100 TB of space and 100 IOPS capacity, a first customer might want to store 90 TB of vacation photos that are rarely accessed. Thus, the first customer would use almost all of the storage capacity of that device, but very few of the possible rate of IOPS from that disk. If a second user has logical areas (less than 10 TB) that are under constant use, such that the user might want almost all 100 IOPS, it can be desirable in some embodiments to place the logical areas for the second user on that disk, even if this increases the total number of partitions. Such an approach can improve utilization of physical resources, which can represent potential cost savings to the provider and, ultimately, the customer.

Further, in some embodiments there can be customers who are not using their committed allocations. When other customers need to temporarily add a partition or expand the size of an existing partition, for example, the system in some embodiments can utilize this unused allocation instead of starting another physical device. Again, this can benefit not only the provider as the number of physical devices can be reduced, but can also benefit both customers as the customer with the guarantee may not have to pay for the entire allocation, and thus can receive a lower cost that would be required for a dedicated resource, and the other customer using the additional temporary increase in allocation can receive a lower cost for the additional resource usage.

Figure 7:
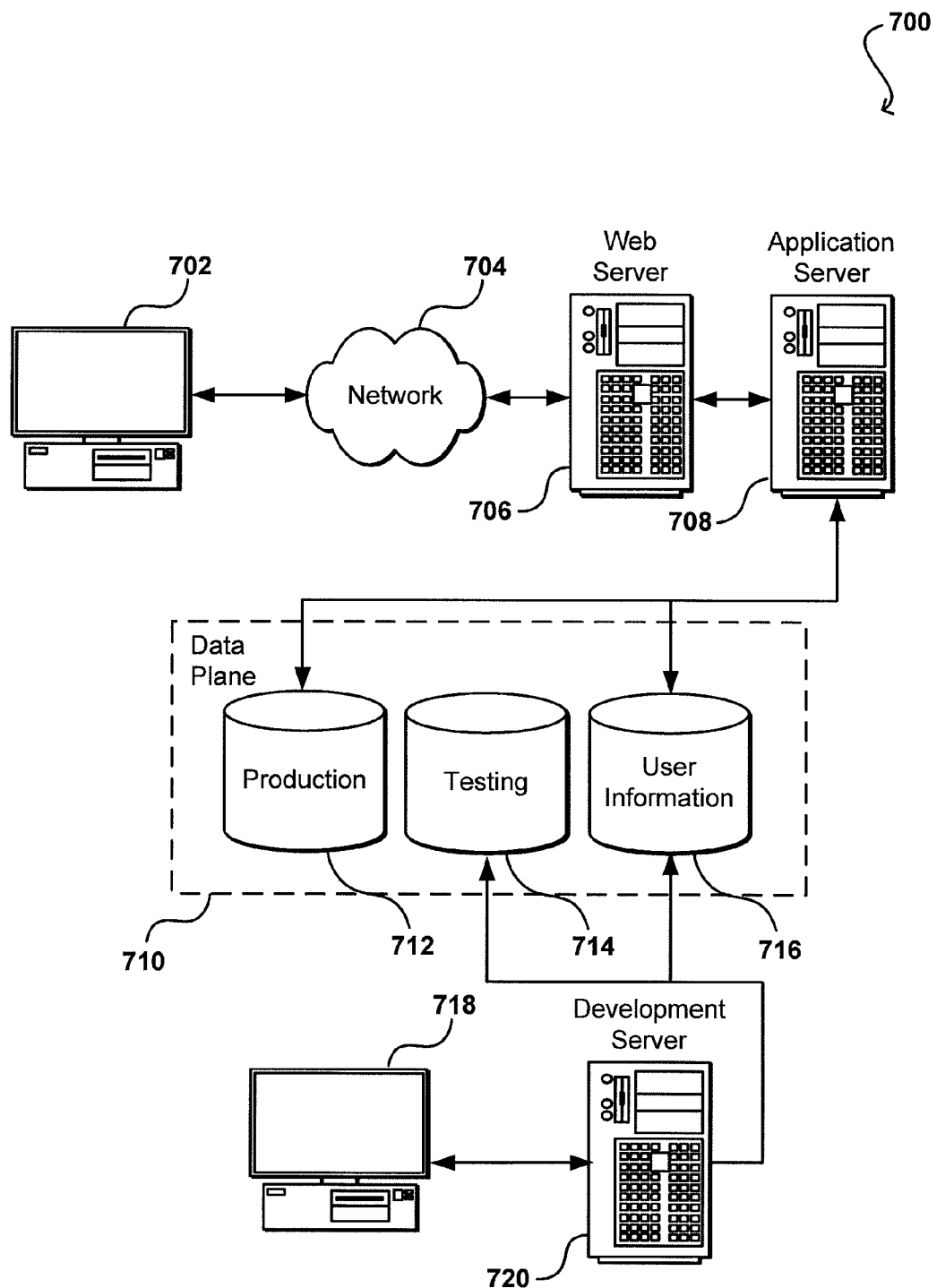
FIG. 7 illustrates an example environment that can take advantage of functionality of the various embodiments.

FIG. 7 illustrates an example of an environment 700 that can utilize and/or take advantage of aspects in accordance with various embodiments. As will be appreciated, although a Web-based environment is used for purposes of explanation, different environments may be used, as appropriate, to implement various embodiments. The environment 700 shown includes both a testing or development portion (or side) and a production portion. The production portion includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 718 allowing a user such as a developer, data administrator, or tester to access the system. The user device 718 can be any appropriate device or machine, such as is described above with respect to the client device 702. The environment also includes a development server 720, which functions similar to the application server 708 but typically runs code during development and testing before the code is deployed and executed on the production side and is accessible to outside users, for example. In some embodiments, an application server can function as a development server, and separate production and testing storage may not be used.

The data store 710 can include several separate data tables, databases, or other data storage mechanisms and media for storing data relating to a particular aspect. For example, the data store illustrated includes mechanisms for storing production data 712 and user information 716, which can be used to serve content for the production side. The data store also is shown to include a mechanism for storing testing data 714, which can be used with the user information for the testing side. It should be understood that there can be many other aspects that may need to be stored in the data store, such as for page image information and access right information, which can be stored in any of the above listed mechanisms as appropriate or in additional mechanisms in the data store 710. The data store 710 is operable, through logic associated therewith, to receive instructions from the application server 708 or development server 720, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

An environment such as that illustrated in FIG. 7 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of storing data in a data volume, comprising:
   under control of one or more computer systems configured with executable instructions,
   receiving a request to store data to a data volume;
   if the data volume does not exist:
      determining at least one functional aspect of the data volume to be created;
      creating a data volume with a storage capacity and a number of partitions based at least in part upon the at least one functional aspect;
      distributing a number of logical areas across the number of partitions, each logical area configured to store a portion of the data in the data volume; and
      maintaining a first set of mappings indicating the logical areas associated with each partition;
   distributing the data across the logical areas associated with the number of partitions, the data in each logical area being mapped using a second set of mappings;
   monitoring the usage of the data volume; and
   in response to detecting at least one functional aspect of the data volume falling outside an allowable range for the current number of partitions,
      determining an adjusted number of partitions necessary to bring the detected at least one functional aspect within the allowable range;
      modifying the data volume to include the adjusted number of partitions;

moving at least one logical area based at least in part upon the adjusted number of partitions in order to at least partially balance the number of logical areas across the adjusted number of partitions; and updating the first set of mappings to indicate the current partition associated with each logical area as a result of moving the at least one logical area, without having to update any of the second set of mappings as a result of the moving.

2. The computer-implemented method of claim 1, wherein the at least one functional aspect includes at least one of a storage capacity, a rate of input/output operations per second (IOPS), a latency, and a bandwidth.

3. The computer-implemented method of claim 1, further comprising:

receiving a request to update at least one functional aspect of the data volume, and determining whether the update causes the at least one functional aspect to fall outside an allowable range, whereby the system is operable to determine an adjusted number of partitions necessary to bring the at least one functional aspect within the allowable range.

4. A computer-implemented method of dynamically adjusting the storage of data in a data volume, comprising:

under control of one or more computer systems configured with executable instructions, monitoring usage of the data volume, the data volume including a number of partitions each containing at least one logical area, data stored to the data volume being distributed across the logical areas;

in response to detecting at least one functional aspect of the data volume falling outside an allowable range for a current number of partitions, determining an adjusted number of partitions necessary to bring the detected at least one functional aspect within the allowable range;

adjusting the data volume to include the adjusted number of partitions;

moving at least one logical area based at least in part upon the adjusted number of partitions in order to at least partially balance the logical areas across the adjusted number of partitions; and updating a first set of mappings to indicate a current partition associated with each logical area as a result of moving the at least one logical area, wherein the at least one logical area is capable of being moved based at least in part upon the adjusted number of partitions without updating a second set of mappings indicating the data stored in each logical area.

5. The computer-implemented method of claim 4, wherein each partition corresponds to a separate physical storage device.

6. The computer-implemented method of claim 4, wherein the data is distributed across the logical areas using at least one of a striping algorithm or a hashing algorithm.

7. The computer-implemented method of claim 4, wherein the at least one functional aspect includes a rate of input/output operations.

8. The computer-implemented method of claim 4, further comprising:

receiving a request to update at least one functional aspect of the data volume, and determining whether the update causes the at least one functional aspect to fall outside an allowable range, whereby the system is operable to determine an adjusted number of partitions necessary to bring the at least one functional aspect within the allowable range.

9. The computer-implemented method of claim 8, wherein the request is received from a customer as a Web services request through an application programming interface (API) of a control plane.

10. The computer-implemented method of claim 4, wherein the allowable range for at least one functional aspect is determined based at least in part upon a rate guarantee provided for the data volume.

11. The computer-implemented method of claim 4, wherein the partitions are capable of storing different numbers of logical areas.

12. A computer-implemented method of distributing data across a data volume, comprising:

under control of one or more computer systems configured with executable instructions, receiving a request to store data to a data volume, the request specifying at least one functional aspect of the data volume to be created;

determining a number of partitions capable of providing the at least one functional aspect, each partition corresponding to a separate physical storage device;

creating the data volume with the determined number of partitions;

distributing a number of logical areas across the number of partitions, each logical area configured to store a portion of the data in the data volume;

maintaining a first set of mappings indicating each logical area associated with each partition;

distributing the data across the logical areas associated with the number of partitions; and maintaining a second set of mappings indicating the data stored in each logical area, wherein an update to the data stored in any logical area does not affect the first set of mappings, and wherein an update to the partition currently associated with a logical area does not affect the second set of mappings.

13. The computer-implemented method of claim 12, wherein the data is distributed across the logical areas using at least one of a striping algorithm or a hashing algorithm.

14. The computer-implemented method of claim 12, wherein the at least one functional aspect includes a rate of input/output operations per second (IOPS).

15. A system for dynamically adjusting the storage of data in a data volume, comprising:

at least one processor; and memory including instructions that, when executed by the at least one processor, cause the system to:

monitor usage of the data volume, the data volume including a number of partitions each containing at least one logical area, data stored to the data volume being distributed across the logical areas;

in response to detecting at least one functional aspect of the data volume falling outside an allowable range for a current number of partitions, determine an adjusted number of partitions necessary to bring the detected at least one functional aspect within the allowable range;

adjust the data volume to include the adjusted number of partitions;

move at least one logical area based at least in part upon the adjusted number of partitions in order to at least partially balance the logical areas across the adjusted number of partitions; and update a first set of mappings to indicate a current partition associated with each logical area as a result of moving the at least one logical area, wherein the at least one logical area is capable of being moved based at least in part upon the adjusted number of partitions without updating a second set of mappings indicating the data stored in each logical area.

16. The system of claim 15, wherein each partition corresponds to a separate physical storage device.

17. The system of claim 15, wherein the data is distributed across the logical areas using at least one of a striping algorithm or a hashing algorithm.

18. The system of claim 15, wherein the at least one functional aspect includes a rate of input/output operations per second.

19. The system of claim 15, wherein the instructions when executed further cause the system to:
receive a request to update at least one functional aspect of the data volume, and
determine whether the update causes the at least one functional aspect to fall outside an allowable range, whereby the system is operable to determine an adjusted number of partitions necessary to bring the at least one functional aspect within the allowable range.

20. The system of claim 15, wherein the request is received from a customer as a Web services request through an application programming interface (API) of a control plane.

21. A computer-readable storage medium including instructions for adjusting usage of a shared computing resource, the instructions when executed by a processor causing the processor to:
monitor usage of the data volume, the data volume including a number of partitions each containing at least one logical area, data stored to the data volume being distributed across the logical areas;
in response to detecting at least one functional aspect of the data volume falling outside an allowable range for a current number of partitions,
determine an adjusted number of partitions necessary to bring the detected at least one functional aspect within the allowable range;
adjust the data volume to include the adjusted number of partitions;
move at least one logical area based at least in part upon the adjusted number of partitions in order to at least partially balance the logical areas across the adjusted number of partitions; and
update a first set of mappings to indicate a current partition associated with each logical area as a result of moving the at least one logical area,
wherein the at least one logical area is capable of being moved based at least in part upon the adjusted number of partitions without updating a second set of mappings indicating the data stored in each logical area.

22. The computer-readable storage medium of claim 21, wherein the data is distributed across the logical areas using at least one of a striping algorithm or a hashing algorithm.

23. The computer-readable storage medium of claim 21, wherein the at least one functional aspect includes a rate of input/output operations per second (IOPS).

24. The computer-readable storage medium of claim 21, wherein the instructions when executed further cause the system to:
receive a request to update at least one functional aspect of the data volume, and
determine whether the update causes the at least one functional aspect to fall outside an allowable range, whereby the system is operable to determine an adjusted number of partitions necessary to bring the at least one functional aspect within the allowable range.

25. The computer-readable storage medium of claim 21, wherein the request is received from a customer as a Web services request through an application programming interface (API) of a control plane.

26. A computer-implemented method of dynamically adjusting the storage of data in a data volume, comprising:
under control of one or more computer systems configured with executable instructions,
monitoring usage of the data volume, the data volume including a number of partitions each containing at least one piece of data;
in response to detecting at least one functional aspect of the data volume falling outside an allowable range for a current number of partitions,
determining an adjusted number of partitions necessary to bring the detected at least one functional aspect within the allowable range;
adjusting the data volume to include the adjusted number of partitions;
moving at least one piece of data based at least in part upon the adjusted number of partitions in order to at least partially balance the pieces of data across the adjusted number of partitions; and
updating a table of mappings to indicate a current partition associated with each moved piece of data,
wherein the table of mappings indicates a current partition associated with each moved piece of data that is different from a default partition associated with the moved piece of data as part of a data distribution scheme.

27. The computer-implemented method of claim 26, wherein the at least one piece of data includes at least one of a data stripe, data chunk, or data block.

28. The computer-implemented method of claim 26, wherein the table of mappings is an override table.

29. The computer-implemented method of claim 26, wherein at least one piece of data is moved between logical areas stored across the number partitions.

* * * * *